United States Patent [19]

Weiss et al.

[11] Patent Number: 4,601,800
[45] Date of Patent: Jul. 22, 1986

[54] PREPARATION OF AQUEOUS SOLUTIONS OF HYDROXYLAMMONIUM CARBONATE

[75] Inventors: Franz-Josef Weiss, Neuhofen; Wolfgang Habermann, Mainz; Peter Hammes, Ruppertsberg; Josef Ritz, Ludwigshafen; Erwin Thomas, Freinsheim; Peter Thoma, Frankenthal, all of Fed. Rep. of Germany

[73] Assignee: BASF Aktiengesellschaft, Ludwigshafen, Fed. Rep. of Germany

[21] Appl. No.: 685,255

[22] Filed: Dec. 24, 1984

[30] Foreign Application Priority Data

Dec. 28, 1983 [DE] Fed. Rep. of Germany ....... 3347258

[51] Int. Cl.[4] .......................... B01D 57/02; C25C 7/00
[52] U.S. Cl. ................................ 204/182.4; 204/101
[58] Field of Search ................. 204/101, 180 P, 182.4

[56] References Cited

U.S. PATENT DOCUMENTS 3,766,038 10/1973 Beck et al. ................. 204/180 P
4,219,396 8/1980 Gancy et al. ............... 204/180 P

FOREIGN PATENT DOCUMENTS 2243904 4/1975 France .
1427689 3/1976 United Kingdom .

OTHER PUBLICATIONS

Chemical Abstracts, vol. 94, p. 134.

Primary Examiner—John F. Niebling
Attorney, Agent, or Firm—Keil & Weinkauf

[57] ABSTRACT

Aqueous solutions of hydroxylammonium carbonate are prepared from aqueous hydroxylammonium salt solutions by electrodialysis by a method in which the aqueous hydroxylammonium salt solution is fed into the middle zone of an electrolysis cell, which is divided into a cathode zone, an anode zone and a middle zone by means of semipermeable membranes, and is electrolyzed, and the catholyte used is an aqueous solution of an ammonium carbonate or an alkali metal carbonate or of one of the corresponding bicarbonates.

12 Claims, No Drawings

PREPARATION OF AQUEOUS SOLUTIONS OF HYDROXYLAMMONIUM CARBONATE

Hydroxylamine is produced industrially in the form of its salts, e.g. the sulfate or phosphate, by catalytic reduction of nitric oxide or nitric acid. In the further conversion of the hydroxylammonium salts, for example to oximes, the corresponding anions are liberated in the form of acids, but it is often difficult to remove such foreign anions from the reaction mixture again. If, on the other hand, free hydroxylamine is prepared by reacting a hydroxylammonium salt with an alkali, the foreign anions cannot be removed completely in this case either. A process has also been disclosed in which the anions are removed by electrodialysis. According to the process described in German Laid-Open Application DOS No. 2,062,436, an aqueous solution of hydroxylammonium sulfate is subjected to electrolysis in the presence of cyclohexanone, cyclohexanone oxime being formed. Because of the instability of the hydroxylamine and the short life of the semipermeable membranes, this procedure is not very suitable.

It is an object of the present invention to provide a process for the preparation of aqueous solutions of hydroxylammonium carbonate which gives high yields and produces aqueous solutions of hydroxylammonium carbonate having a very low content of foreign anions.

We have found that this object is achieved by a process for the preparation of aqueous solutions of hydroxylammonium carbonate from an aqueous hydroxylammonium salt solution by electrodialysis, the aqueous hydroxylammonium salt solution being fed into the middle zone of an electrolysis cell which is divided into a cathode zone, an anode zone and a middle zone by means of semipermeable membranes, and being electrolyzed, wherein the catholyte used in an aqueous solution of an ammonium carbonate or an alkali metal carbonate or of one of the corresponding bicarbonates.

The novel process has the advantages that it takes place with high yields, the decomposition of the hydroxylamine is suppressed, the semipermeable membranes, in particular for the cathode space, have a fairly long life, and aqueous hydroxylammonium carbonate solutions having a very low content of foreign anions, e.g. less than 10 ppm, can be prepared. Finally, when reacted further, the hydroxylammonium carbonate solutions provided do not introduce any foreign anions, since the carbonate anion decomposes during the reaction, giving carbon dioxide, which can readily be removed.

According to the invention, aqueous solutions of hydroxylammonium salts are used as starting materials, particularly suitable hydroxylammonium salts being those of stable oxyacids, such as sulfuric acid, nitric acid, phosphoric acid and carboxylic acids, e.g. acetic acid or propionic acid. Hydroxylammonium sulfate and phosphate solutions have become particularly important industrially. As a rule, 5–30% strength by weight aqueous hydroxylammonium salt solutions are used. In the preparation of more highly concentrated hydroxylammonium carbonate solutions, the hydroxylammonium salt consumed is advantageously supplemented until the desired final concentration is reached. Advantageously, the hydroxylammonium salt solutions used contain less than 1 ppm of metal ions of sub-groups 1, 2, 5, 6, 7 and 8 of the periodic table.

The electrolysis is carried out in a cell which is divided into a cathode zone, an anode zone and a middle zone by means of two semipermeable membranes. The aqueous hydroxylammonium salt solution being electrolyzed is introduced into the middle zone. The anolyte used in the anode zone is, as a rule, an aqueous solution of an oxyacid, in particular one which corresponds to the anion of the hydroxylammonium salt solution used. Advantageously, the aqueous solutions employed contain from 0.1 to 50% by weight of the oxyacid. A particularly good current efficiency is achieved if, instead of an aqueous acid solution, an aqueous solution of an alkali metal hydroxide, e.g. sodium hydroxide, an alkali metal carbonate, e.g. sodium carbonate, or an alkaline earth metal hydroxide, e.g. calcium hydroxide, is used.

According to the invention, the catholyte used in the cathode zone is an aqueous solution of an ammonium carbonate or an alkali metal carbonate or of one of the corresponding bicarbonates. Suitable ammonium carbonates or bicarbonates are ammonium carbonate, ammonium bicarbonate and methylammonium carbonate. Sodium carbonate or potassium carbonate solution is preferably used. Advantageously, the aqueous solutions contain from 0.5 to 50, in particular from 1 to 20, % by weight of ammonium or alkali metal carbonate. It has furthermore proven useful to pass carbon dioxide into the aqueous solution of alkali metal carbonate in the cathode space during the electrolysis, in order to maintain the content of carbonate ions. It is also advantageous to pass carbon dioxide into the middle zone.

The catholyte advantageously contains, for example, from 0.001 to 50, preferably from 0.02 to 10, in particular from 0.05 to 0.8, % by weight of ammonia and/or amines. Suitable amines are primary, secondary or tertiary amines, for example those which possess alkyl radicals of 1 to 6 carbon atoms, which can furthermore have hydroxyl or alkoxy groups as substituents. Cycloalkylamines having 5 to 8 carbon atoms in the ring are also suitable. Other useful compounds are 5-membered to 7-membered cyclic amines in which the nitrogen atom is a ring member. Examples of suitable amines are tripropylamine, tributylamine, dipropylamine, n-propylamine, dibutylamine, iso-butylamine, 2-methoxyethylamine, 3-methoxypropylamine, ethanolamine, diethanolamine, methoxymethylamine, cyclohexylamine, aminoethylmorpholine, aminoethylpyrrolidone and polyamines obtainable by reacting amines with ethyleneimine. The amines can be present in the catholyte in dissolved or dispersed form.

The electrolysis is advantageously carried out using a current density of from 0.1 to 10, in particular from 1 to 3.5, $kA/m^2$. Advantageously, the temperature is kept at from 10° to 40° C., preferably from 15° to 28° C., during this procedure.

Advantageously used cathodes are corrosion-resistant materials having a low hydrogen overvoltage, e.g. stainless steels, chromium nickel steels, nickel, nickel-iron alloys containing from 65 to 95% by weight of iron, or iron coated with nickel-iron alloys, but preferably graphite or alkali-resistant titanium or zirconium alloys, such as titanium-iron, titanium-nickel, zirconium-iron or zirconium-nickel. Examples of suitable anode materials are titanium, tantalum, niobium or niobium-tantalum alloys which are doped at the surface with platinum metals, platinum metal oxides or, preferably, platinates and have a low oxygen overvoltage. The latter should be less than 300 mV at 1 $kA/m^2$.

Advantageously, the electrolysis is carried out in the absence of molecular oxygen, in the middle zone. The content of molecular oxygen should not exceed 10 ppm.

It has also proven advantageous if the aqueous hydroxylammonium salt solution being electrolyzed contains a stabilizer. Examples of suitable stabilizers are 8-hydroxyquinaldine, 2,3-didehydrohexono-1,4-lactone, flavones, such as morin, hydroxyquinolines, such as 8-hydroxyquinoline, anthocyanidins, such as cyanidinium chloride, and hydroxyanthraquinones, such as quinalizarine, which, if required, are used in combination with polyhydroxybenzenes such as pyrogallol. Other suitable stabilizers are, for example, quercetin, benzonitrile, benzamidoxime, isocyanates, N-phenyl-N-hydroxythiourea and alkali metal salts of ethylenediaminetetraacetic acid. The concentration of stabilizers is advantageously from $5.10^{-4}$ to 1, in particular from $5.10^{-3}$ to $5.10^{-2}$, % by weight, based on the hydroxylammonium salt. Stabilizers which form chelates with metal ions have proven particularly useful.

In the electrolysis cell, it is preferable to use semipermeable membranes which consist of anion exchange resins. Semipermeable membranes which have a weakly basic reaction at least on the side facing the middle zone are particularly useful. Examples of suitable membranes are anion exchange membranes possessing the $R—N(CH_3)_3^+$ group or weakly basic groups, such as polymeric amines or polymers or copolymers which contain a primary, secondary or tertiary amine, e.g. of the $R—NH_2$, $R—NH(CH_3)$ or, in particular, $R—N(CH_3)_2$ type, as charge-carrying groups. Particularly suitable carriers for the ion exchange groups are polystyrene/divinylbenzene copolymers containing from 4 to 16, in particular from 6 to 8, % by weight of divinylbenzene.

Examples of other suitable weakly basic membranes are those which consist of hydrogenated styrene/butadiene block copolymers, polybutadiene, polyisoprene, polyisobutylene or polyethylene and contain finely divided titanium oxide hydroxide, zirconium oxide hydroxide, kaolinite, montmorillonite, apatite, synthetic hydroxylapatite, magnesium oxide hydroxide, aluminum oxide hydroxide or aluminum zirconium oxide hydroxide in amounts of from 40 to 70% by weight. Titanium oxide hydroxide, zirconium oxide hydroxide, synthetic hydroxylapatite or zirconium aluminum oxide hydroxide is preferably used.

It is also possible to coat membranes with the above-mentioned weakly basic agents, with or without a binder, such as hydrogenated styrene/butadiene block copolymers, polyethylene, polypropylene or polybutadiene. The weakly basic layer is produced by incorporating the said agent into the thermoplastic binder on a roll mill, or by applying binders dissolved in organic solvents or finely dispersed in water, e.g. latex dispersions of polyisobutylene, polybutadiene or polyisopropylene, which contain weakly basic agents, onto the membrane.

Polymeric membrane layers, e.g. of vinyl chloride and/or acrylonitrile, which contain, in particular, from 40 to 75% by weight of polymeric tertiary amines having a molecular weight higher than 250, in particular higher than 500, are also suitable. In coating the membrane, the polymers are used in solution, for example in dimethylformamide or dimethyl sulfoxide, and the coating is then dried.

The aqueous hydroxylammonium carbonate solutions obtainable by the process of the invention are useful for the preparation of oximes.

The Examples which follow illustrate the process according to the invention.

EXAMPLE 1

An electrodialysis cell divided into three compartments is provided with 2 anion exchange membranes, each having an electrode surface of 1 $dm^2$. The anion exchange membranes consist of a styrene/divinylbenzene copolymer which contains about 6% of divinylbenzene, and quaternary ammonium groups as charge carriers. A 1 $dm^2$ titanium mesh electrode which is doped at the surface with platinates of type $Li_{0.3}Pt_3O_4$ is present in the anode space. The cathode (1 $dm^2$) consists of nickel. The catholyte used is a 10% strength by weight aqueous potassium carbonate solution containing 0.1% by weight of dibutylamine, while the anolyte employed is 3% strength by weight aqueous sulfuric acid. The catholyte is gassed with carbon dioxide during electrolysis. In the middle compartment of the electrodialysis cell, 1,500 g of 25% strength by weight aqueous hydroxylammonium sulfate solution containing 100 ppm of benzonitrile are circulated at 24° C. At a current density of 15 $A/dm^2$ and an initial cell voltage of 6.8 V, an aqueous hydroxylammonium carbonate solution containing <20 ppm of sulfate ions is obtained after 250 Ah. The material yield is ~98%, based on hydroxylammonium sulfate employed, and the current efficiency is ~52%, based on sulfate.

If no dibutylamine is used in the catholyte, the material yield is ~91%, based on hydroxylammonium sulfate used.

EXAMPLE 2

An electrodialysis cell as described in Example 1, which is divided into three compartments, is provided with two anion exchange membranes which consist of a vinyl chloride/acrylonitrile copolymer which contains quaternary ammonium groups as charge carriers. The cathode used is a nickel electrode, while the anode employed is a platinate-doped titanium anode. The catholyte consists of 10% strength by weight aqueous potassium carbonate solution, which is gassed with carbon dioxide. The anolyte used is 2% strength by weight aqueous sulfuric acid. In the middle compartment of the electrodialysis cell, 1,500 g of aqueous 25% strength by weight hydroxylammonium sulfate solution are circulated, the solution likewise being gassed with carbon dioxide. At a current density of 20 $A/dm^2$, an aqueous hydroxylammonium carbonate solution containing <20 ppm of sulfate ions is obtained after 292 Ah. The material yield is ~92.5%, based on hydroxylammonium sulfate employed.

The addition of 0.15% by weight of dibutylamine to the catholyte increases the material yield to 98%. The current efficiency is ~50%, based on sulfate.

We claim:

1. A process for the preparation of an aqueous solution of hydroxylammonium carbonate from an aqueous hydroxylammonium salt solution of electrodialysis, the aqueous hydroxylammonium salt solution being fed into the middle zone of an electrolysis cell which is divided into a cathode zone, an anode zone and a middle zone by means of semipermeable membranes, and being electrolyzed, wherein the catholyte used is an aqueous solution of an ammonium carbonate or an alkali metal carbonate or of one of the corresponding bicarbonates, and wherein the catholyte further contains ammonia and/or an amine.

2. The process of claim 1, wherein carbon dioxide is passed into the catholyte.

3. The process of claim 1, wherein the content of molecular oxygen in the middle zone is less than 10 ppm.

4. The process of claim 1, wherein the hydroxylammonium salt solution used contains a stabilizer for hydroxylamine.

5. The process of claim 1, wherein the hydroxylammonium salt solution used contains less than 1 ppm of heavy metals.

6. The process of claim 1, wherein the semipermeable membranes are weakly basic, at least on the side which faces the middle zone.

7. The process of claim 1, wherein carbon dioxide is passed into the middle zone.

8. The process of claim 1, wherein the ammonia and/or amine in the catholyte is present in an amount of about 0.001 to about 50%, by weight.

9. The process of claim 1, wherein the ammonia and/or amine in the catholyte is present in an amount of about 0.02 to about 10% by weight.

10. The process of claim 1, wherein the ammonia and/or amine in the catholyte is present in an amount of about 0.05 to about 0.8% by weight.

11. The process of claim 1, wherein the carbonate is present in the aqueous solution in an amount of from about 0.5 to 50% by weight.

12. The process of claim 1, wherein the carbonate is present in the aqueous solution in an amount of about 1 to 20% by weight.

* * * * *